United States Patent [19]

Eubank

[11] Patent Number: 4,979,773

[45] Date of Patent: Dec. 25, 1990

[54] STOWABLE SEAT WITH OUTBOARD PIVOTAL LATCH

[75] Inventor: William J. Eubank, Livonia, Mich.

[73] Assignee: Ford Motor Company, Dearborn, Mich.

[21] Appl. No.: 256,448

[22] Filed: Oct. 12, 1988

[51] Int. Cl.⁵ .............................................. B60N 2/16
[52] U.S. Cl. .................................. 296/65.1; 296/68.1;
297/346; 297/468; 248/421; 248/423
[58] Field of Search ......................... 296/65.1, 68.1;
297/378, 379, 344-346, 468; 248/585, 586, 595, 421, 423

[56] References Cited

U.S. PATENT DOCUMENTS

| | | | |
|---|---|---|---|
| 2,432,554 | 12/1947 | Knoedler | 248/585 X |
| 2,926,948 | 3/1960 | Koplin et al. | 297/378 |
| 3,189,312 | 6/1965 | Bilancia | 296/65.1 X |
| 3,444,949 | 5/1969 | Pollock | 296/65.1 X |
| 3,473,776 | 10/1969 | Costin | 248/423 X |
| 3,758,158 | 9/1973 | Radke et al. | 297/468 |
| 3,794,380 | 2/1974 | Mertz | 297/379 X |
| 4,046,349 | 9/1977 | MacAfee | 297/344 X |
| 4,133,556 | 1/1979 | Glinski | 296/65.1 X |
| 4,225,184 | 9/1980 | Strowick | 297/468 |
| 4,229,041 | 10/1980 | Werner | 297/468 |
| 4,707,010 | 11/1987 | Croft et al. | 297/378 X |
| 4,720,143 | 1/1988 | Schwartz et al. | 296/65.1 X |
| 4,763,924 | 8/1988 | Karlin et al. | 297/468 X |
| 4,805,953 | 2/1989 | Yamauchi | 296/65.1 X |
| 4,807,932 | 2/1989 | Hong | 297/344 X |

FOREIGN PATENT DOCUMENTS

| | | | |
|---|---|---|---|
| 1135786 | 8/1962 | Fed. Rep. of Germany | 297/345 |
| 2251949 | 5/1974 | Fed. Rep. of Germany | 297/355 |
| 3011165 | 10/1981 | Fed. Rep. of Germany | 297/468 |

Primary Examiner—Dennis H. Pedder
Attorney, Agent, or Firm—Daniel M. Stock; Clifford L. Sadler

[57] ABSTRACT

A stowable seat assembly is provide with a simple latch link cooperating with the seat cushion frame to adjustably position the seat as it folds to a stowed position controlled by a parallel link arrangement. A gas spring assist is also provided for returning the seat cushion to its normal elevated position after stowing and an auxilary linkage is provided for coordinating the motion of seat belt componentry mounted on the seat with the stowing motion of the seat cushion.

13 Claims, 3 Drawing Sheets

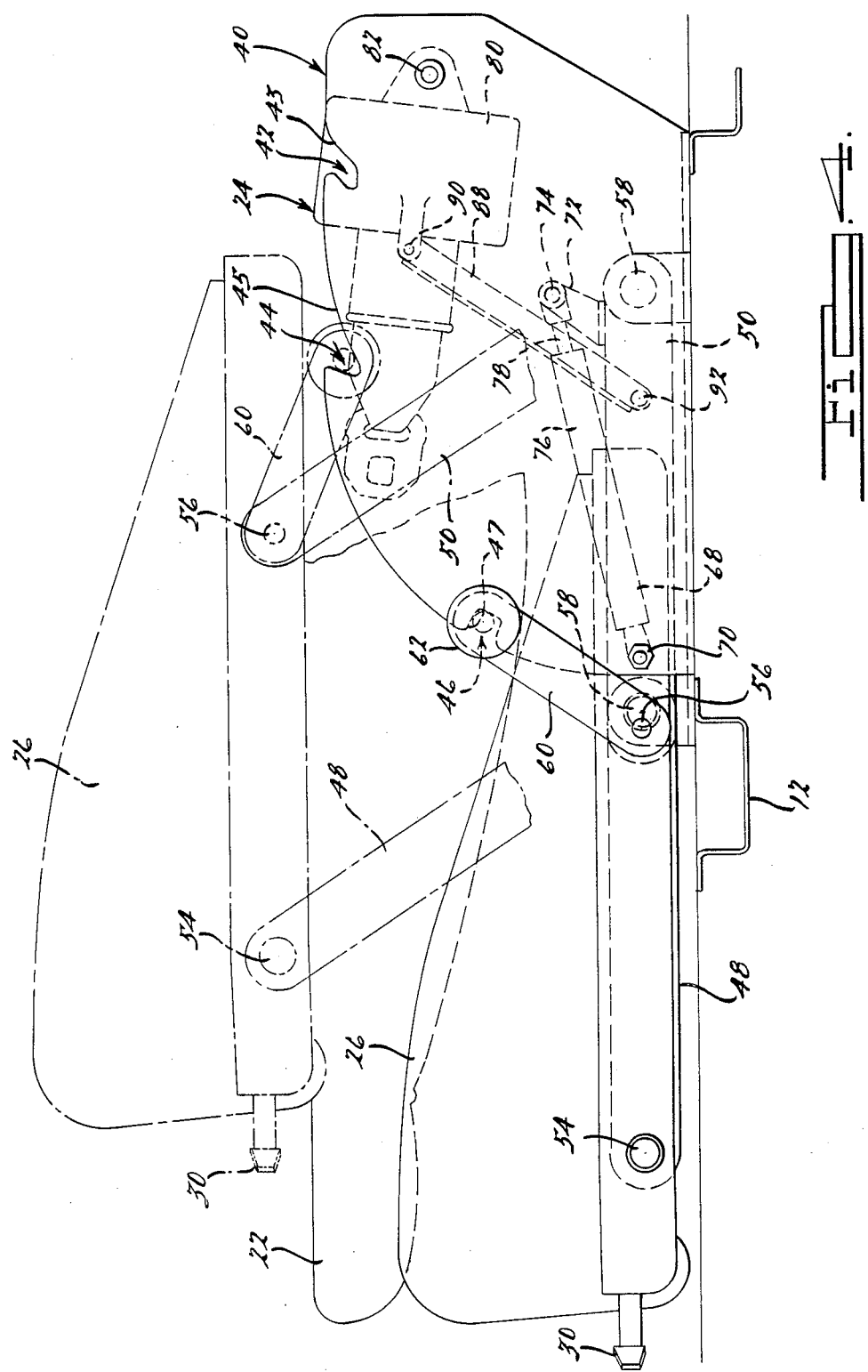

STOWABLE SEAT WITH OUTBOARD PIVOTAL LATCH

BACKGROUND OF THE INVENTION

The present invention relates generally to automobile seats and more specifically to latching mechanisms for establishing a plurality of positions for such seats between an elevated operative seating position and a folded down position.

DESCRIPTION OF THE PRIOR ART

It is known in the vehicle seating arts to provide various mechanisms for adjustably positioning the height of a seat cushion with respect to the floor of a vehicle upon which it is mounted. One type of mechanism in use is the type that employs pairs of parallel links to support the seat cushion above the vehicle floor and provide for pivoting parallelogram movement of the cushion forwardly and downwardly. Bilancia, U.S. Pat. No. 3,189,312, is exemplary of such designs. A contemporaneous example of such design is that shown in the copending application of Applicant and Robert W. Martienssen assigned to the assignee of the present invention. Latch mechanisms have been provided with seats of this type which employ detents for receiving retractable pins to stop movement of the seat cushion during the pivoting travel of the parallel links.

Other latching mechanisms are known for adjustably positioning relatively movable components in the seating arts. For example, seat backs may be fixed to seat cushions through agency of ring ear and pinion arrangements for adjustable positioning and through latch pawl and detent connections for inertia responsive positioning Croft et al, U.S. Pat. No. 4,707,010, is examplary of the latter of such designs. The prior art latching devices suffer from the disadvantage that the positioning of the retractable pins with respect to the latched detents requires a certain amount of dexterity in handling that can be greater than is desirable.

A further disadvantage lies in the fact that as variable positioning devices, the latches of the prior art do not cooperate with or provide for easing the return of the seat cushion from a fully lowered position to the upright operative position. For heavy seat cushion frames utilized in some vehicle applications, this can result in particularly cumbersome operation.

SUMMARY OF THE INVENTION

Responsive to the deficiencies in the prior art, it is an object of the present invention to provide a stowable seat assembly of the type in which first and second pairs of longitudinally spaced parallel links are used to support a seat cushion for parallelogram movement between an elevated operative seating position and a stowed position proximate the vehicle floor, which includes an economically producible and easily operable means for latching the seat cushion in a plurality of positions with respect to the floor of the vehicle.

According to another object of the present invention, the seat assembly linkage mechanism embodies an assist mechanism for facilitating movement of the linkage from the stowed position to the operative detent locations.

According to a feature of the present invention, a resiliently biased latch assembly is provided which consists of a latch link pivotally mounted on the seat cushion and biased into engagement with the detent.

According to another feature of the present invention, an assist mechanism is provided to include a gas spring operatively connected between the linkage mechanism and a fixed portion of the latch assembly.

According to still another feature of the present invention, linkage means is provided pivotally connected between the latch mechanism and a vehicle occupant restraint component to control movement of the component between upright and stowed positions consistent with corresponding positions of the stowable seat assembly.

BRIEF DESCRIPTION OF THE DRAWINGS

These and other objects and features of the invention will become apparent to those skilled in the vehicle seating arts upon reading the following description with reference to the accompanying drawings in which:

FIG. 4 is a side view similar to FIG. 3 with the seat illustrated in partially lowered and fully stowed positions.

DESCRIPTION OF THE PREFERRED EMBODIMENT

Figure 1:
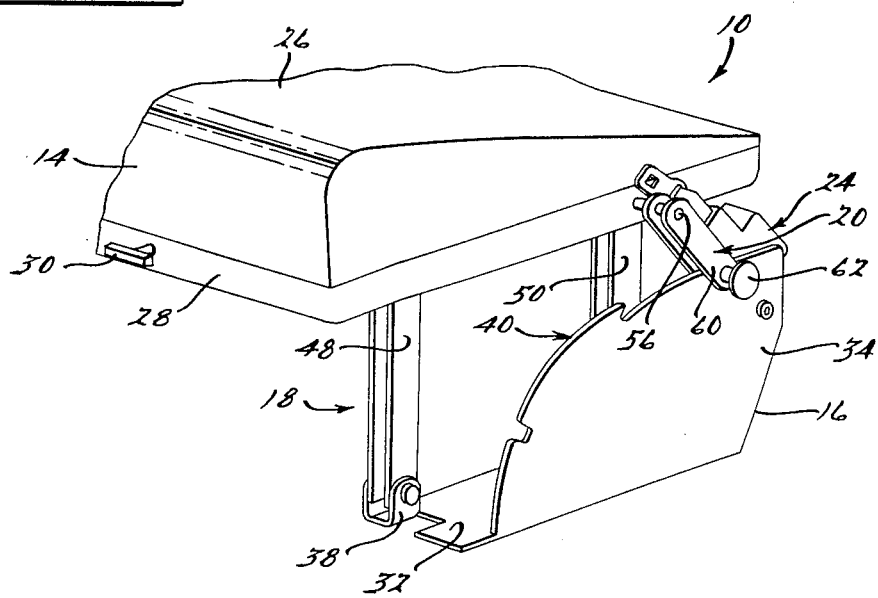
FIG. 1 is a perspective view of a stowable seat assembly for a vehicle according to the present invention.

A stowable vehicle seat assembly 10 adapted to be mounted on the floor 12 of a vehicle is illustrated as comprising a seat cushion assembly 14, a support frame 16, a pivoting link assembly 18 and a latch link assembly 20 operatively connected between the seat cushion assembly 14 and the support frame 16. It will be understood that a seat back assembly illustrated as 22 in FIG. 4 is pivotally mounted adjacent the rear end of the seat cushion assembly 14 in a conventional fashion. In the preferred embodiment shown, a seat belt component assembly 24 is also mounted on the support frame 16 adjacent the rear end of the seat cushion assembly 14.

The seat cushion assembly 14 comprises essentially a conventional padded cushion member 26 and a generally rectangular horizontal frame 28 defining the lower periphery of the seat cushion assembly 14. A handle 30 may be provided for facilitating manual movement of the seat cushion assembly by operation of the pivoting link assembly 18.

The support frame 16 is illustrated as comprising a base plate 32 adapted to be secured to the floor 12 of the vehicle and an upstanding side plate 34. Laterally inwardly spaced trunnion mounts 36, 38 extend upwardly from the base plate 32 for pivotally mounting the pivoting link assembly 18. The upper surfaces 40 of the side plate 34 are formed in arcuately arrayed curvilinear fashion and have first and second canted detents 42, 44, respectively, and a locking detent notch 46 formed extending inwardly therefrom.

Figure 2:
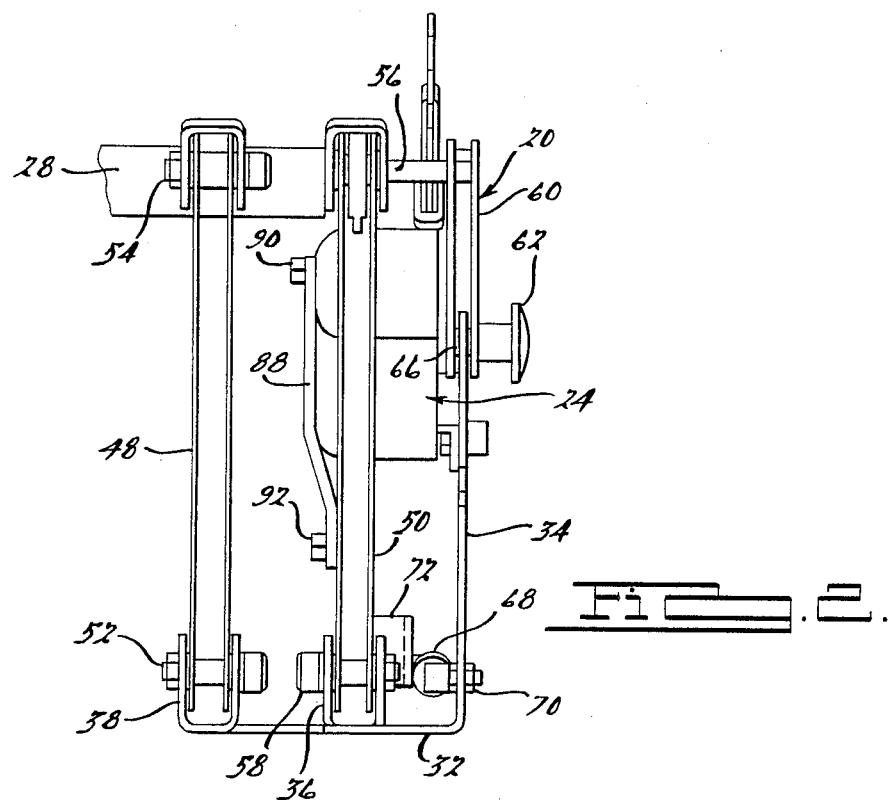
FIG. 2 is a partial front view of the seat assembly of FIG. 1.
Figure 3:
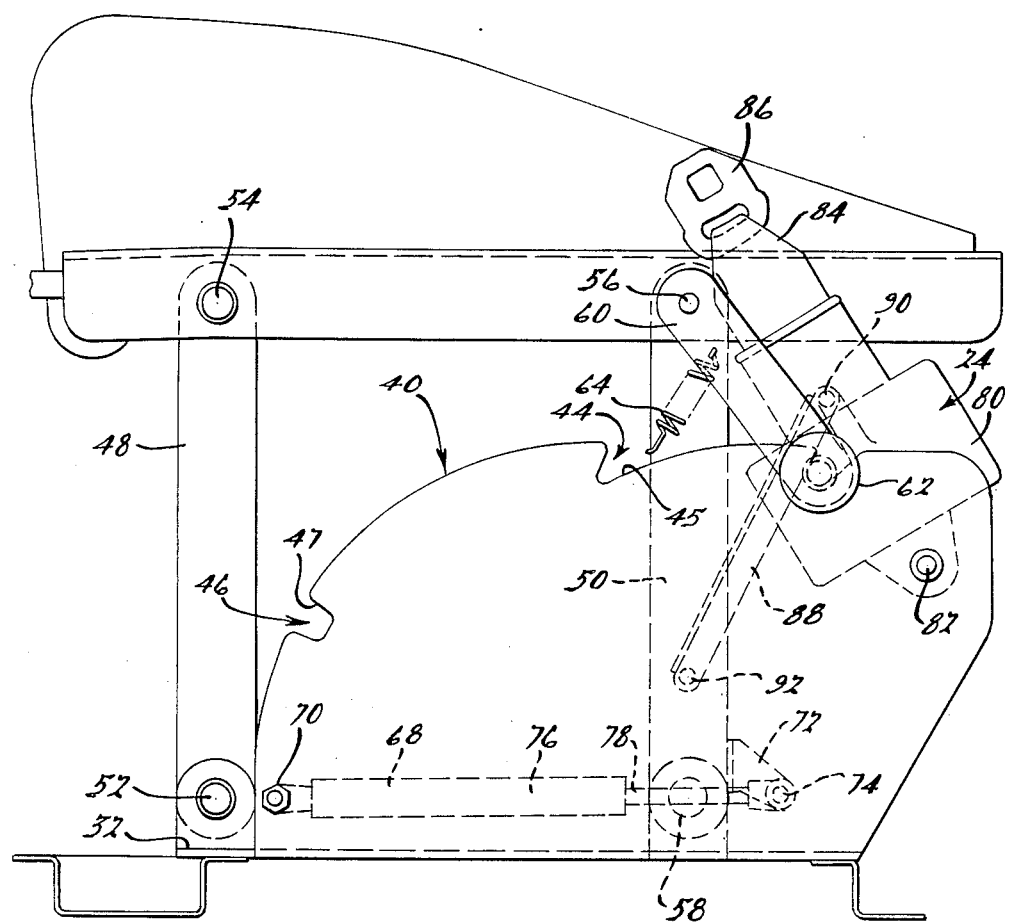
FIG. 3 is a side view of the seat of FIG. 1 in the operative seating position.

The arrangement and operation of the components of the pivoting link assembly 18 can be best appreciated by references to FIGS. 2-4. It will be understood that while components on the left side (as facing forward) of the seat assembly 10 are described with respect to the pivoting link assembly 18, construction of the seat assembly 10 according to the present invention contemplates the symmetrical positioning of identical components on the other side of the seat. In addition, the latch link assembly 20 and the seat belt component assembly 24 illustrated on the left side in the drawing figures may be positioned on either or both sides of the seat assembly 10.

The pivoting link assembly 18 includes forward and rear links 48, 50, respectively, which may be of equal length and are pivotally mounted between the seat cushion assembly 14 and the support frame 16. The forward link 48 is pivotally mounted to the trunnion 38 as through the pin indicated at 52 and to the seat cushion frame 28 as through a pivot pin 54. The rear link 50 is also mounted to the seat cushion frame 28 through a pivot pin 56. The lower end of the rear link 50 is pivotally mounted to the outer trunnion mount 36 of the support frame 16 through a pivot pin 58. This linkage arrangement allows for pivotal movement of the seat cushion assembly 14 from the fully upright operative position shown in FIG. 3 in which the seat cushion assembly 14 is well elevated above the floor 12 of the vehicle to the intermediate and fully stowed positions of FIG. 4 by permitting movement in parallelogram fashion, as illustrated in FIG. 4.

The latch link assembly 20 consists of a link member 60 having an operating handle 62 at its lower end and having its upper end mounted for pivotal movement about the pin 56. A coil spring 64 is operatively connected between the rear link 50 of pivoting link assembly 18 and the latch link 60 to resiliently bias the link 60 toward abutting engagement against the upper surfaces 40 of the side plate 34. A reduced diameter portion of the handle 62, such as indicated by a pin 66, as may best be seen in FIG. 2, is sized to be engagable with the detents 42, 44, 46 of the side plate 34, the coil spring 64 drawing the link 60 toward positions in which the pin 64 engages the detents 42, 44, 46. The rear surface 43 of the first detent 42 may be canted to facilitate entry by the pin 66 moving forwardly and to resist inadvertent withdrawal of the pin 66 to establish a stable upward position as shown in FIG. 3.

Manipulation of the link 60 to turn counterclockwise as viewed in FIGS. 3 and 4 will withdraw the pin 66 from the detent 42. If the handle is released, the link will be drawn into engagement with a portion of upper surface 40 as the seat cushion assembly is moved forwardly and downwardly. The pin 66 then slidingly engages the surface 40 into a position abutting the detent 44. The seat cushion assembly 14 may be returned to the FIG. 3 position from this intermediate position by simply pushing the seat backwardly without manipulation of the link 60. The pin 66 will again slidingly engage portions of the upper surface 40 of the side plate 34 until dropped into engagement with the first detent 42 by operation of the spring 64.

Forward and downward movement to the fully stowed position shown in the solid line of FIG. 4 may continue from the position in which the pin 66 engages the second detent 44 by again manipulating the latch link 60 to swing in counterclockwise fashion to a position abutting forward portions of the upper surface 40 of the side plate 34, continuing sliding engagement until the pin 66 registers with the locking detent 46. In some vehicle applications, provision of this locking detent may be highly desirable so that the load floor defined by the pivoting movement of the seat back 22 into the horizontal confronting relationship shown in the solid line in FIG. 4 with the seat cushion assembly 14 in the fully downward position makes it desirable to lockingly establish this downward position. The trailing edge 47 of the detent 46 in this configuration is preferably arranged substantially normal to the adjacent portion of the upper surface 40 of the side plate 34 as contrasted to the general curvilinear slope of the trailing edge 45 of the second detent 44 configured to facilitate rearward movement. Counterclockwise rotation of the link 60 to disengage the pin 66 from the locking detent 46 is accordingly necessary to return the seat assembly 10 to the operative position of FIG. 3.

To facilitate the clockwise movement, as viewed in FIGS. 3 and 4 of the pivoting link assembly 18, the stowable seat assembly 10 of the present invention preferably includes a position responsive actuator, such as a gas spring 68, indicated diagrammatically in FIGS. 3 and 4. The gas spring 68 is pivotally mounted at one end on the side plate 34, as indicated at 70, and on the other end, on a support bracket 72, as indicated at 74, secured proximate the lower end of the rear link 50. No further description of the gas spring 68 is deemed necessary since many such devices are commercially available, and their detailed construction does not form a part of the present invention. Necessarily, however, the gas spring 68 includes a cylinder portion 76 and a telescopically engaged rod portion 78 received within it. The gas spring 68 is arranged so that it is substantially fully extended in the operative seating position of FIG. 3 and does not exert significant force tending to rotate the pivoting link assembly 18 clockwise. Movement of the pivoting link assembly 18 to the fully stowed position shown in the solid line in FIG. 4, however, shortens the gas spring 68 to a position in which energy is stored in a conventional manner through the compression of gas within the gas spring 68. Release of the latch link 60 from the FIG. 4 position indicating engagement with the locking detent 46 permits the gas spring 68 to operate to assist in pivoting the movement of the rear link 50 in clockwise fashion owing to the offset between the pivot pin 58 of rear link 50 and the pivot pin 74 of the gas spring 68.

The seat belt component assembly 24 is illustrated as including a retractor body 80 pivotally mounted as by pin 82 to the side plate 34. A seat belt 84 extends outwardly from the retractor body 80 and terminates in a buckle tongue 86. It is desirable to arrange a seat belt component assembly of the type shown to position the buckle tongue 86 in a position similar to that shown in FIG. 3 readily accessible to an occupant of the stowable seat assembly 10. It is also desirable that the seat belt component assembly 24 not remain in the upwardly canted orientation shown during movement of the seat cushion assembly 14 to the stowed position of FIG. 4 to assure that the seat belt component 24 does not protrude upwardly into the space provided for the seat back assembly 22 in its folded down position. The stowable seat assembly 10 of the present invention, therefore, provides for movement of the seat belt component assembly 24 controlled by the motion of the pivoting link assembly 18 by providing a positioning link 88 pivotally mounted as by an upper pin 90 to the retractor body 80 and through a lower pin 92 to a lower portion of the rear link 50. As may be seen in FIG. 4, this arrangement provides for the pivotally mounted seat belt component assembly 24 being drawn in counterclockwise fashion downwardly in concert with the motion of the rear link 50.

While only certain embodiments of the stowable seat assembly of the present invention have been described, others are possible without departing from the scope of the appended claims.

I claim:

1. A stowable seat assembly for a vehicle comprising:
   a seat cushion assembly for supporting a vehicle occupant and having a cushion member and a generally rectangular horizontal surrounding frame;
   a seat back assembly;
   a support frame fixedly secured to the vehicle floor defined by a pair of vertically upstanding side plates positioned laterally outboard of the seat cushion assembly;
   first and second pairs of longitudinally spaced parallel links, each pivotally mounted on one end to one side of the seat cushion frame and on the other end to one side of the support frame and jointly movable in parallelogram fashion whereby the seat cushion assembly is movable between an operative position elevated from the vehicle floor and a stowed position proximate the vehicle floor;
   latch link means pivotally mounted at one end on at least one side of the seat cushion frame and having a latch pin carried proximate its other end; and
   means defining a plurality of detents in at least one of the support frame side plates for receiving the latch pin to prevent further movement of the seat cushion assembly between the operative and stowed positions.

2. A stowable seat assembly as defined in claim 1, and further comprising gas spring means pivotally connected to the support frame and one of the parallel links, operative to urge the seat cushion assembly to the operative position.

3. A stowable seat assembly as defined in claim 1, and further comprising means for resiliently biasing the latch link means toward the support frame.

4. A stowable seat assembly as defined in claim 1, wherein the latch link is pivotally mounted to the seat cushion frame coaxially with one of the parallel links.

5. A stowable seat assembly as defined in claim 4, and further comprising gas spring means pivotally connected to the support frame and one of the parallel links, operative to urge the seat cushion assembly to the operative position.

6. A stowable seat assembly for a vehicle comprising;
   a seat cushion assembly for supporting a vehicle occupant and having a cushion member and a generally rectangular horizontal surrounding frame;
   a seat back assembly;
   a support frame fixedly secured to the vehicle floor defined by a pair of vertically upstanding side plates positioned laterally outboard of the seat cushion assembly;
   first and second pairs of longitudinally spaced parallel links, each pivotally mounted on one end to one side of the seat cushion frame and on the other end to one side of the support frame and jointly movable in parallelogram fashion whereby the seat cushion assembly is movable between an operative position elevated from the vehicle floor and a stowed position proximate the vehicle floor;
   latch link means pivotally mounted at one end on at least one side of the seat cushion frame and having a latch pin carried proximate its other end;
   a seat belt component assembly having one end pivotally mounted on the support frame longitudinally spaced from the parallel links and the other end canted upwardly above the seat cushion frame; and
   positioning link means pivotally mounted at one end to the seat belt component assembly and at the other end to one of the parallel links whereby movement of the seat cushion frame from the operative position to the stowed position effects downward pivotal movement of the seat belt component to a substantially horizontal position wherein the seat belt component other end is positioned below portions of the seat cushion frame.

7. A stowable seat assembly as defined in claim 6, and further comprising gas spring means pivotally connected to the support frame and one of the parallel links, operative to urge the seat cushion assembly to the operative position.

8. A stowable seat assembly as defined in claim 6, and further comprising means for resiliently biasing the latch link means toward the support frame.

9. A stowable seat assembly as defined in claim 6, wherein the latch link is pivotally mounted to the seat cushion frame coaxially with one of the parallel links.

10. A stowable seat assembly as defined in claim 9, and further comprising gas spring means pivotally connected to the support frame and one of the parallel links, operative to urge the seat cushion assembly to the operative position.

11. A stowable seat assembly for a vehicle comprising:
    a seat cushion assembly for supporting a vehicle occupant and having a cushion member and a generally rectangular horizontal surrounding frame;
    a seat back assembly;
    a support frame fixedly secured to the vehicle floor defined by a pair of vertically upstanding side plates positioned laterally outboard of the seat cushion assembly;
    first and second pairs of longitudinally spaced parallel links, each pivotally mounted on one end to one side of the seat cushion frame and on the other end to one side of the support frame and jointly movable in parallelogram fashion whereby the seat cushion assembly is movable between an operative position elevated from the vehicle floor and a stowed position proximate the vehicle floor;
    a seat belt component assembly having one end pivotally mounted on the support frame longitudinally spaced from the parallel link and the other end canted upwardly above the seat cushion frame; and
    positioning link means pivotally mounted at one end to the seat belt component assembly and at the other end to one of the parallel links whereby movement of the seat cushion frame from the operative position to the stowed position effects downward pivotal movement to the seat belt component to a substantially horizontal position wherein the seat belt component other end is positioned below portions of the seat cushion frame.

12. A stowable seat assembly as defined in claim 11, and further comprising gas spring means pivotally connected to the support frame and one of the parallel links, operative to urge the seat cushion assembly to the operative position.

13. A stowable seat assembly for a vehicle comprising:
    a seat cushion assembly for supporting a vehicle occupant and having a cushion member and a generally rectangular horizontal surrounding frame;
    a seat back assembly;

a support frame fixedly secured to the vehicle floor defined by a pair of vertically upstanding side plates positioned laterally outboard of the seat cushion assembly;

a first and second pairs of longitudinally spaced parallel links, each pivotally mounted on one end to one side of the seat cushion frame and on the other end to one side of the support frame and jointly movable in parallelogram fashion whereby the seat cushion assembly is movable between an operative position elevated from the vehicle floor and a stowed position proximate the vehicle floor;

latch link means pivotally mounted at one end on at least one side of the seat cushion frame and having a latch pin carried proximate its other end; and means defining a plurality of detents, arcuately arrayed in the path of pivotal motion of the parallel links, in at least one of the support frame side plates for receiving the latch pin to prevent further movement of the seat cushion assembly between the operative and stowed positions.

* * * * *